US011065900B2

(12) United States Patent
Alfekri et al.

(10) Patent No.: US 11,065,900 B2
(45) Date of Patent: Jul. 20, 2021

(54) TRANSFER OF LATEX-CONTAINING INK COMPOSITIONS (71) Applicant: Hewlett-Packard Development Company, L.P., Fort Collins, CO (US)

(72) Inventors: Dheya M. Alfekri, San Diego, CA (US); Fredrick Muya Makau, San Diego, CA (US); Maria Jesus Perez, San Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 270 days.

(21) Appl. No.: 15/543,710

(22) PCT Filed: Mar. 11, 2015

(86) PCT No.: PCT/US2015/019880
§ 371 (c)(1),
(2) Date: Jul. 14, 2017

(87) PCT Pub. No.: WO2016/144350
PCT Pub. Date: Sep. 15, 2016

(65) Prior Publication Data
US 2018/0001685 A1   Jan. 4, 2018

(51) Int. Cl.
B41M 3/12        (2006.01)
C09D 11/107      (2014.01)
C09D 11/322      (2014.01)
C09D 11/12       (2006.01)
D06P 1/44        (2006.01)
D06P 5/24        (2006.01)
B41M 1/26        (2006.01)
(Continued)

(52) U.S. Cl.
CPC ............... B41M 3/12 (2013.01); B41M 1/26 (2013.01); B41M 5/03 (2013.01); C09D 11/033 (2013.01); C09D 11/107 (2013.01); C09D 11/12 (2013.01); C09D 11/322 (2013.01); D06P 1/44 (2013.01); D06P 5/009 (2013.01)

(58) Field of Classification Search
None
See application file for complete search history.

(56) References Cited

U.S. PATENT DOCUMENTS 4,235,657 A  * 11/1980 Greenman ............... B41M 5/03
                                                    156/234
5,515,093 A    5/1996 Haruta et al.
(Continued)

OTHER PUBLICATIONS

International Search Report and Written Opinion dated Nov. 30, 2015 for PCT/US2015/019880; Applicant Hewlett-Packard Development Company L.P.

Primary Examiner — Jill E Culler
(74) Attorney, Agent, or Firm — Thorpe North & Western LLP (57) ABSTRACT Provided in one example herein is a method of printing. The method includes disposing onto a transfer paper an ink composition to form thereon an image, the ink composition including pigments and latex particulates. The method includes transferring the image from the imaged transfer paper onto a substrate comprising fabric by a lamination process. The lamination process includes: laminating together the substrate, the imaged transfer paper, and a release paper, whereby the image is transferred from the transfer paper onto the substrate.

18 Claims, 3 Drawing Sheets (51) Int. Cl.
  *B41M 5/03*  (2006.01)
  *C09D 11/033*  (2014.01)

(56) References Cited

U.S. PATENT DOCUMENTS

| | | | |
|---|---|---|---|
| 6,503,977 | B1 | 1/2003 | Branham et al. |
| 6,596,116 | B2 * | 7/2003 | Macedo ............... B44C 1/172 |
| | | | 156/230 |
| 6,677,007 | B1 | 1/2004 | Warner et al. |
| 6,753,050 | B1 * | 6/2004 | Dalvey ............... B41M 5/40 |
| | | | 428/32.12 |
| 6,761,943 | B1 | 7/2004 | Warner et al. |
| 6,838,498 | B1 | 1/2005 | Bagwell et al. |
| 6,846,076 | B2 | 1/2005 | Li |
| 6,936,648 | B2 | 8/2005 | Bagwell et al. |
| 7,864,206 | B2 | 1/2011 | Yasumatsu |
| 7,943,214 | B1 | 5/2011 | Bamberg et al. |
| 8,017,180 | B2 * | 9/2011 | Macedo ............... B41M 5/0256 |
| | | | 427/177 |
| 8,556,411 | B2 | 10/2013 | Niu |
| 8,563,100 | B1 | 10/2013 | Zhou et al. |
| 8,784,508 | B2 | 7/2014 | Ellis |
| 8,939,569 | B2 | 1/2015 | Ng et al. |
| 8,969,243 | B2 | 3/2015 | Nahm |
| 2003/0000410 | A1 * | 1/2003 | Wagner ............... B41M 5/0256 |
| | | | 101/483 |
| 2003/0207041 | A1 * | 11/2003 | Aono ............... B41M 3/12 |
| | | | 427/145 |
| 2005/0070629 | A1 | 3/2005 | Roberts |
| 2005/0142307 | A1 * | 6/2005 | Kronzer ............... B41M 3/12 |
| | | | 428/32.51 |
| 2006/0065155 | A1 | 3/2006 | Byers et al. |
| 2006/0283540 | A1 * | 12/2006 | Kronzer ............... B41M 3/12 |
| | | | 156/235 |
| 2008/0305285 | A1 * | 12/2008 | Katampe ............... B41M 3/12 |
| | | | 428/32.5 |
| 2010/0089525 | A1 * | 4/2010 | Kronzer ............... B41M 5/0256 |
| | | | 156/230 |
| 2011/0111145 | A1 * | 5/2011 | Katampe ............... B41M 3/12 |
| | | | 428/32.72 |
| 2012/0026238 | A1 | 2/2012 | Ganapathiappan et al. |

\* cited by examiner

```
┌─────────────────────────────────────────────────────────────────────┐
│ Disposing onto a transfer paper an ink composition to form thereon an │──S101
│ image, the ink composition comprising pigments and latex particulates │
└─────────────────────────────────────────────────────────────────────┘
                                    │
                                    ▼
┌─────────────────────────────────────────────────────────────────────┐
│ Transferring the image from the imaged transfer paper onto a          │
│ substrate comprising fabric by a lamination process comprising:       │
│       laminating together the substrate, the imaged transfer paper,   │──S102
│ and a release paper, whereby the image is transferred from the        │
│ transfer paper onto the substrate                                     │
└─────────────────────────────────────────────────────────────────────┘
```

Fig. 1

```
┌─────────────────────────────────────────────────────────────────────┐
│ Disposing onto a transfer paper an ink composition to form thereon an │──S201
│ image, the ink composition comprising pigments and latex particulates │
└─────────────────────────────────────────────────────────────────────┘
                                    │
                                    ▼
┌─────────────────────────────────────────────────────────────────────┐
│ Transferring the image from the imaged transfer paper onto a         │
│ substrate comprising fabric by a lamination process comprising:      │
│         mounting the substrate with a front side facing up onto a    │
│ bottom mandrel of a laminator;                                       │
│         mounting the imaged transfer paper with the image            │
│ facing up onto a middle mandrel of the laminator; and                │
│         mounting the release paper onto a top mandrel of the         │──S202
│ laminator                                                            │
│         feeding the substrate, the imaged transfer paper, and the    │
│ release paper through laminator rollers, whereby the image is        │
│ transferred from the transfer paper onto the substrate               │
└─────────────────────────────────────────────────────────────────────┘
```

Fig. 2

TRANSFER OF LATEX-CONTAINING INK COMPOSITIONS

BACKGROUND

Digital inkjet printing of signs and other graphic arts applications is increasingly replacing screen printing and other analog printing technologies. Digital inks for large format printing may provide relatively good image quality, durability, and permanence. The inks may be non-aqueous or aqueous. Inkjet printing may be versatile with respect to the types the medium (substrate) that this printing technique may be applied to. One example of such a medium is fabric.

BRIEF DESCRIPTION OF THE DRAWINGS

The drawings are provided to illustrate various examples of the subject matter described herein in this disclosure (hereafter "herein" for short, unless explicitly stated otherwise) related to transfer of a latex-containing ink composition, and are not intended to limit the scope of the subject matter. The drawings are not necessarily to scale.

DETAILED DESCRIPTION

Ink transfer technology in fabric currently involves mainly using sublimation dyes combined with other ingredients to enable the dyes to react or imbibe into the fabric. In general, the dye-sublimation process may involve a high transfer sublimation temperature (e.g., 400° F.) and pressure. Also, the cost of commercial transfer paper is very high—it ranges from $0.5 to $2.0 per square foot. It is used in a sheet form of printing relatively small areas. Roll to roll transfer printing technology does exist but is limited for most transfer paper. The cost of current commercial products is influenced by the multi layers of coating used to achieve the desired transfer properties.

In view of the aforementioned challenges, the Inventors have recognized and appreciated the advantages of transferring a latex-containing ink composition. Following below are more detailed descriptions of various examples related to the transfer of a latex-containing composition, particularly that onto a fabric-containing substrate. The various examples described herein may be implemented in any of numerous ways.

Provided in one aspect of the examples is a method of printing, the method comprising: disposing onto a transfer paper an ink composition to form thereon an image, the ink composition comprising pigments and latex particulates; and transferring the image from the imaged transfer paper onto a substrate comprising fabric by a lamination process comprising: laminating together the substrate, the imaged transfer paper, and a release paper, whereby the image is transferred from the transfer paper onto the substrate.

Provided in another aspect of the examples is a method of printing, the method comprising: disposing onto a transfer paper an ink composition to form thereon an image, the ink composition comprising pigments and latex particulates; and transferring the image from the imaged transfer paper onto a substrate comprising fabric by a lamination process comprising: mounting the substrate with a front side facing up onto a bottom mandrel of a laminator; mounting the imaged transfer paper with the image facing up onto a middle mandrel of the laminator; and mounting the release paper onto a top mandrel of the laminator feeding the substrate, the imaged transfer paper, and the release paper through laminator rollers, whereby the image is transferred from the transfer paper onto the substrate.

Provided in another aspect of the examples is a system, comprising: a printer to dispose onto a transfer paper an ink composition to form thereon an image, the ink composition comprising pigments and latex particulates; and a laminator to: mount a substrate comprising a fabric with a front side facing up onto a bottom mandrel of a laminator; mounting the imaged transfer paper with the image facing up onto a middle mandrel of the laminator; and mounting a release paper onto a top mandrel of the laminator; feeding the substrate, the imaged transfer paper, and the release paper through laminator rollers, whereby the image is transferred from the transfer paper onto the substrate.

Fabric Substrate

The term "fabric" herein may refer to both textile and cloth. A fabric may be a flexible woven material having a network of natural or artificial fibers often referred to as thread or yarn. In one example, yarn is produced by spinning raw fibers of wool, flax, cotton, or other materials to produce long strands. A fabric herein may be formed by weaving, knitting, crocheting, knotting, or pressing fibers together, or bonding that may be used in production of further goods (garments, etc.). Fabric herein may also comprise interlacing fibers. Fabric herein may refer to a finished piece of fabric (e.g., cloth) of any type and for any suitable purpose. In one example, fabric is a piece of cloth, such as garments. The fabric may comprise any suitable material. For example, the fabric may comprise at least one of cotton and polyester.

Latex-Containing Ink Composition

The ink composition herein may be any ink composition that is suitable for inkjet printing. The ink composition may comprise any number of constituents. For example, the ink composition may comprise latex particulates, pigments, etc. "Latex particulates" or "latex" herein may refer to discrete polymeric particles dispersed in a liquid. In one example, latex particulates may be dispersed in a liquid vehicle to form an ink. In one example, the ink may be an inkjet ink and may further comprise a colorant.

The latex particulates may comprise polyurethane-based latex. The latex particulates may also have a structure similar to the polyurethane structure but have a non-polyurethane component. The latex particulates may be present in conjunction with wax emulsions to provide desirable print durability properties. In one example, the ink composition and associated method described herein may comprise intermingled low Tg polymer strands and high Tg polymer strands. It is noted that when discussing the ink compositions described herein and methods, each of these discussions may be considered applicable to each of these examples, whether or not they are explicitly discussed in the context of that example. Thus, for example, in discussing latex particulates in an inkjet ink, such latex particulates may also be used in a method of manufacturing an inkjet ink, and vice versa.

Polyurethane latex particulates may provide desirable characteristics in printing applications including desirable scratch resistance. The ink composition may also comprise a wax and non-polyurethane latex particulates manufactured to have a structure that mimics polyurethane dispersion particulates, thereby providing scratch resistance without the use of polyurethane materials. In one example, vinyl monomers may be used to mimic the soft and hard domains found in polyurethane polymers by synthesizing vinyl latex particulates having intermingled low Tg polymer strands and high Tg polymer strands, and that such latex particulates may be formulated into ink compositions with a minimal amount of wax emulsions that provide the desired printing results.

The ink composition described herein may further comprise at least one of an aqueous ink vehicle and a wax. In one example, the ink composition further comprises both an aqueous ink vehicle and a wax emulsion, in addition to the latex particulates.

The latex particulates may comprise multiple intermingled discrete polymer strands, including a low Tg polymer strand having a Tg below about 50° C. and a high Tg polymer strand having a Tg at about 50° C. or above. Additionally, the Tg of the high Tg polymer strand may be at least about 50° C. higher than the Tg of the low Tg polymer strand. The inkjet may also include a colorant. In one example, the colorant may be a pigment. In one specific aspect, the pigment may impart color to the ink. The refractive index of the low Tg polymer strand may be within about 1% of the refractive index of the high Tg polymer strand. In one example, by matching the refractive index of the polymer strands, the latex particulates described herein may provide desirable gloss and haze.

The wax in the ink composition described herein may be in the form of a wax emulsion. Wax emulsions may be commercially available products from a number of vendors, for example Keim-Additec, Lubrizol, Michelman, and BYK Chemie. Examples of wax emulsions include Lubrizol: Liquilube™ 411, Liquilube™ 405, Liquilube™ 488, Liquilube™ 443, Liquilube™ 454; Michelman: ME80825, ME48040, ME98040M1, ME61335, ME90842, ME91240, ML160; Keim-Additec: Ultralube® E-521/20, Ultralube® E-7093, Ultralube® 7095/1, Ultralube® E-8046, Ultralube® E-502V, Ultralube® E-842N: Byk: Aquacer® 2650, Aquacer® 507, Aquacer® 533, Aquacer® 515, Aquacer® 537, Aquaslip™ 671, and Aquaslip™ 942.

The wax (e.g., in the form of an emulsion) may have a melting point of between about 50° C. and about 150° C.—e.g., between about 60° C. and about 110° C., between about 80° C. and about 100° C., etc. Generally, the wax may have a particle size ranging from about 50 nm to about 600 nm. In one example, the wax may have a particle size ranging from about 200 nm to about 300 nm. Generally, the wax may be present in the ink at a concentration ranging from about 0.25 wt % to about 5 wt %. In one example, the wax may be present at an amount ranging from about 0.5 wt % to about 1.5 wt %. Additionally, the wax emulsions may be compatible with high acid acrylic dispersants and hydrocolloids. By compatible, the waxes described herein may be used without causing aggregation or precipitation of the dispersants/hydrocolloids particularly over extended periods of time (weeks/months at ambient temperature or days/weeks at elevated temperature such as about 40° C. to about 65° C.). Incompatibility may occur variously by increases in wax particle size, phase separation of wax, or creaming at a faster rate than in the absence of destabilizing materials.

The low Tg polymer strand may be prepared from multiple co-monomers. Such multiple co-monomers generally include 2 or more monomers. The high Tg polymer strand may be prepared from the same monomers used in the preparation of the low Tg polymer strand but at a different ratio. In one example, the low Tg polymer strand may be polymerized from two monomers in a ratio ranging from 80:20 to 50:50 and the high Tg polymer strand may be polymerized from the same monomers in a ratio ranging from 40:60 to 5:95. The ratio of soft to hard polymer strand may vary from 50:50 to 10:90. Varying the ratio may provide for different Tgs. By using the same co-monomers, the polymer strands may have a similar refractive index; by using three co-monomers, the polymers' refractive index may be controlled with even greater accuracy while controlling Tg simultaneously. In one example, the refractive index of the low Tg polymer strand may be within about 1% of the refractive index of the high Tg polymer strand. In one example, the refractive index of the low Tg polymer strand may be within about 0.5% of the refractive index of the high Tg polymer strand. Additionally, the multiple co-monomers may be selected to have a refractive index within about 1% of one another when polymerized, or in one example, within about 0.5% of each other when polymerized.

The low Tg polymer strand and the high Tg polymer strand have different Tg's such that the resulting latex particulate may provide hard and soft domains similar to a polyurethane particle. In one example, the Tg of the low Tg polymer strand may be below about 20° C. In one example, the Tg is be below 0° C. In another example, the Tg of the high Tg polymer strand is at about 90° C. or above. In one example, the Tg is above about 100° C. Additionally, the difference in the Tg's between the low Tg polymer strand and the high Tg polymer strand may be generally at least about 50° C. In one example, the difference is at least about 70° C. In one example, the difference may be at least about 90° C., and in another example, may be at least about 100° C.

The latex particulates may comprise polymers having monomers selected from at least one of acrylates, methacrylates, vinyls, styrenes, ethylenes, vinyl chlorides, vinylidene chlorides, maleate esters, fumarate esters, itaconate esters, combinations thereof, and mixtures thereof. For example, the monomers of the polymer strands described herein may be vinyl monomers. In one example, the monomers may be selected from the group of vinyl monomers, acrylate monomers, methacrylate monomers, styrene monomers, ethylene, vinyl chloride, vinylidene chloride, maleate esters, fumarate esters, itaconate esters combinations thereof, and mixtures thereof. In one example, the monomers may include acrylates, methacrylates, and styrenes. Additionally, the monomers may include hydrophilic monomers including acid monomers, and hydrophobic monomers. Monomers that may be polymerized in forming the high Tg and low Tg polymer strands include, without limitation, styrene, p-methyl styrene, α-methyl styrene, methyl methacrylate, hexyl acrylate, hexyl methacrylate, butyl acrylate, butyl methacrylate, ethyl acrylate, ethyl methacrylate, 2-ethylhexyl acrylate, 2-ethylhexyl methacrylate, propyl acrylate, propyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, ethoxylated behenyl methacrylate, polypropyleneglycol monoacrylate, isobornyl methacrylate, cyclohexyl methacrylate, cyclohexyl acrylate, t-butyl methacrylate, n-octyl methacrylate, lauryl methacrylate, tridecyl methacrylate, alkoxylated tetrahydrofurfuryl acrylate, isodecyl acrylate, isobornyl methacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, combinations thereof, derivatives thereof, and mixtures thereof.

Acidic monomers that may be polymerized to form the high Tg and low Tg polymer strands include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, and mixtures thereof.

The latex particulates may have various shapes, sizes, and molecular weights. The latexes particulates may have various particle sizes and molecular weights. In one example, the latex particulates may have a weight average molecular weight (Mw) of about 5,000 to about 500,000. In one example, the latex particulates have a weight average molecular weight (Mw) ranging from about 100,000 to about 500,000. In some other examples, the latex particulates have a weight average molecular weight of about 200,000 to 300,000.

The average particle diameter of the latex particulates may be from about 10 nm to about 1 µm; in some other examples, from about 10 nm to about 500 nm; and, in yet other examples, from about 100 nm to about 300 nm. The particle size distribution of the latex particulates is not particularly limited, and either latex having a broad particle size distribution or latex having a mono-dispersed particle size distribution may be used. It is also possible to use two or more kinds of latex particles each having a mono-dispersed particle size distribution in combination.

The terms "liquid vehicle" and "ink vehicle" herein may each refer to the liquid fluid in which latex particulates and wax are placed to form an ink. In one example, the liquid vehicle may also include a colorant. A wide variety of ink vehicles may be employed. Such ink vehicles may include a mixture of a variety of different agents, including, surfactants, solvents, co-solvents, anti-kogation agents, buffers, biocides, sequestering agents, viscosity modifiers, surface-active agents, water, etc. In addition to the colorants, the liquid vehicle may carry solid additives such as polymers, latexes, UV curable materials, plasticizers, etc., provided there are no multivalent metal salts present in the liquid vehicle. Additionally, the terms "aqueous liquid vehicle" and "aqueous vehicle" may each refer to a liquid vehicle including water as a solvent. In one example, water may comprise a majority of the liquid vehicle.

The ink vehicle described herein may be aqueous. For example, the ink vehicle may comprise water, and in some instances, may further comprise water, and may further include co-solvents present in total at from about 0.1 wt % to about 50 wt %, depending on the printing technique (e.g. jetting architecture), though amounts outside of this range may also be used. Further, for ink vehicle and fixer vehicles, additional non-ionic, cationic, and/or anionic surfactants may be present, ranging from about 0.01 wt % to about 10 wt %. Additionally, the balance of the ink vehicle and fixer vehicle formulations may include purified water, biocides, viscosity modifiers, and materials for pH adjustment, sequestering agents, preservatives, and the like. In one example, the ink vehicle may be predominantly water and may be referred to as an aqueous liquid vehicle.

The ink composition herein may also comprise a colorant, which may be a dye and/or pigment. As used herein, "dye" refers to compounds or molecules that impart color to an ink vehicle. As such, dye includes molecules and compounds that absorb electromagnetic radiation or certain wavelengths thereof. For example, dyes include those that fluoresce and those that absorb certain wavelengths of visible light. Generally, dyes are water soluble. Furthermore, as used herein, "pigment" generally includes pigment colorants, magnetic particles, aluminas, silicas, and/or other ceramics, organo-metallics, metallic particulates, or other opaque particles. In one example, the ink composition herein comprises pigments as a colorant and is at least substantially free of dyes (e.g., completely free of dyes) as a colorant.

The inkjet ink compositions described herein may also be suitable for use on many types of substrates of recording media, including but not limited, non-porous vinyl media. One example of a recording medium is a heat transfer paper. The ink compositions may also be used on substrate that comprises fabric, such as any of those described herein. In one example, the media may be gloss media. The term "gloss" herein may refer to the amount of light reflected by an object's surface, such as an inkjet media surface. Gloss may be quantified and measured relative to specific specular angles from an object surface. The specular angle is the angle equal to but opposite the angle of incidence. This specular light is responsible for the highlights visible on shiny materials. When quantifying gloss, it may be measured at angles of 20°, 60°, and 85° off of the normal. Gloss measurements are indicated by gloss units in relation to the angle used for measurement. In one example, "60° gloss" is the gloss of an image measured by using "BYK-Gardner micro-TRI-gloss" meter with incident angle set at 60°.

The ink compositions described herein may include alkyl ethoxylate surfactants. Such surfactants may include, but are not limited to, TERGITOL® 15-S-7, TERGITOL® 15-S-9, TERGITOL® TMN-6 90%, and NEODOL® 91-6. In one example, the surfactant may have an HLB value ranging from about 12 to about 13.5. As used herein, "HLB" refers to hydrophile-lipophile-balance which is a measure of the balance or proportion of hydrophilic to lipophilic portions of a molecule. In another example, the surfactant may be present in the inkjet ink composition at a concentration ranging from about 1.5 wt % to about 3.5 wt %. In another example, the surfactant may have a pour point of less than 10° C. The term "pour point" herein may refer to is the lowest temperature at which a liquid becomes semi solid and loses its flow characteristics.

Classes of co-solvents that may be used may include organic co-solvents, including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

In one example, for printing on non-porous media, the ink compositions described herein may comprise an ink vehicle, a surfactant, and a cationic polymer, where the ink vehicle includes water and co-solvent. The co-solvent may have a boiling point from about 160° C. to about 250° C. and is generally present in an amount of about 1 wt % to about 40 wt %, such that the ink is formulated for printing on non-porous media. Also, the ink vehicle generally includes no more than about 5 wt % volatile co-solvent, where "volatile" in one example herein is defined as a solvent having a boiling point lower than about 160° C., and also generally includes no more than about 3 wt % non-volatile co-solvent, hereby defined as a solvent having a boiling point higher than about 250° C. In one example, water is not a solvent or co-solvent, but is in addition to the co-solvents described herein. In one example, the ink vehicle may include multiple co-solvents having a boiling point ranging from 160° C. to 250° C. In another example, the ink vehicle may be devoid of non-volatile solvent. In still another example, the ink vehicle may be devoid of volatile solvent.

The ink compositions described herein may further comprise various additives employed to enhance the properties of the ink composition for specific applications. Examples of these additives include those added to inhibit the growth of harmful microorganisms. These additives may be biocides, fungicides, and other microbial agents, which are routinely used in ink formulations. Examples of suitable microbial agents include, but are not limited to, NUOSEPT (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to minimize, or even entirely eliminate, the deleterious effects of heavy metal impurities, and buffer solutions may be used to control the pH of the ink. An amount of 0 wt % to about 2 wt %, for example, may be used. Viscosity modifiers and buffers may also be present, as well as other additives known to those skilled in the art to modify properties of the ink as desired. Such additives may be present at from 0 wt % to about 20 wt %.

In addition to the ink compositions described herein, the present disclosure provides for methods relating thereto. Generally, a method of making an inkjet ink may comprise dispersing a wax emulsion and a latex in an ink vehicle. The wax emulsion and the latex may be any of those described herein.

Further, the method may include polymerizing a first ratio of multiple co-monomers to form first polymer strands, introducing a second ratio of the same co-monomers, and polymerizing the second ratio of the same co-monomers to form the latex particulate including second polymer strands that are discrete and intermingled with the first polymer strands.

The latex particulate is generally formed in two stages, forming a first set of polymer strands and then a second set of polymer strands. Without intending to be bound by any particular theory, it is thought that after the first polymer strands are synthesized into an initial latex particulate, a second ratio of the monomers may be introduced to the initial latex particulate, the monomers form the second set of polymer strands within the initial latex particulate thereby forming a final latex particulate that comprises two different types of discrete polymer strands that are intermingled. Such latex structure is different than traditional copolymer and/or homogenous copolymer latexes or core/shell latexes that have a first polymer in an inner core and a second polymer forming an outer shell around the core.

In one example, the first polymer strands may be low Tg polymer strands and the second polymer strands may be high Tg polymer strands. Alternatively, in another example, the first polymer strands may be high Tg polymer strands and the second polymer strands may be low Tg polymer strands. As such, the present latex structure may be manufactured independently of the sequence of polymer strand formation.

Method of Printing

Figure 1:
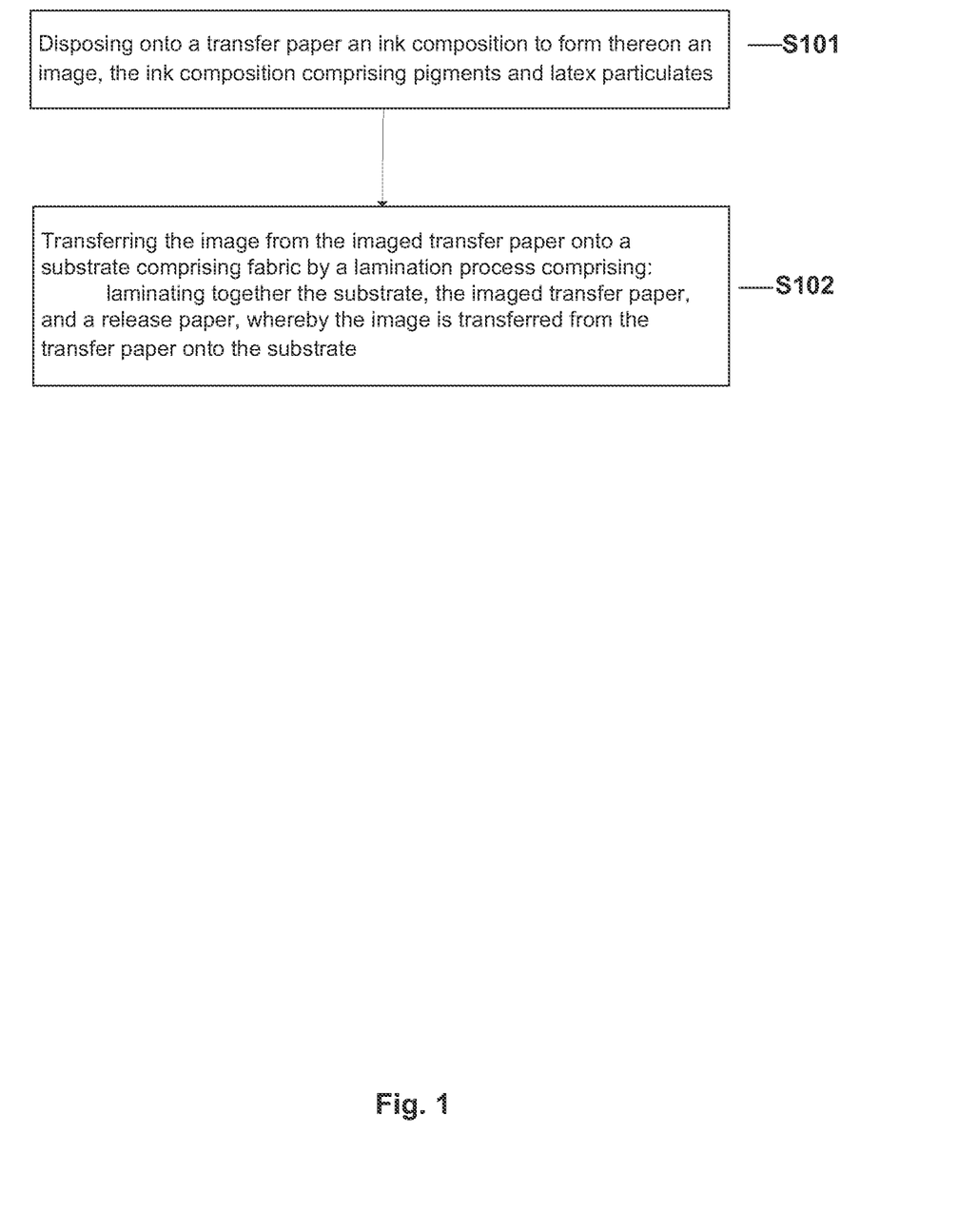
FIG. 1 is a flowchart illustrating the processes involved in one example of a method of printing described herein.

The term "printing" herein may encompass disposing an ink composition onto a substrate, transferring an ink composition from one substrate to another, or both. For example, "printing" herein may encompass printing an ink composition onto a first substrate (e.g., a transfer paper), and then the image on the first substrate is transferred onto a second substrate (e.g., fabric). The ink compositions described herein may be employed for a printing method, such as an inkjet printing process that involves any suitable number of processes. FIG. 1 is a flowchart illustrating the processes involved in one example of such a method of printing. As shown in FIG. 1, the method may comprise disposing onto a transfer paper an ink composition to form thereon an image, the ink composition comprising pigments and latex particulates (S101).

The method of printing as shown in FIG. 1 further comprises transferring the image from the imaged transfer paper onto a substrate comprising fabric by a lamination process (S102). In this example, the lamination process further comprises laminating together the substrate, the imaged transfer paper, and a release paper, whereby the image is transferred from the transfer paper onto the substrate.

Figure 2:
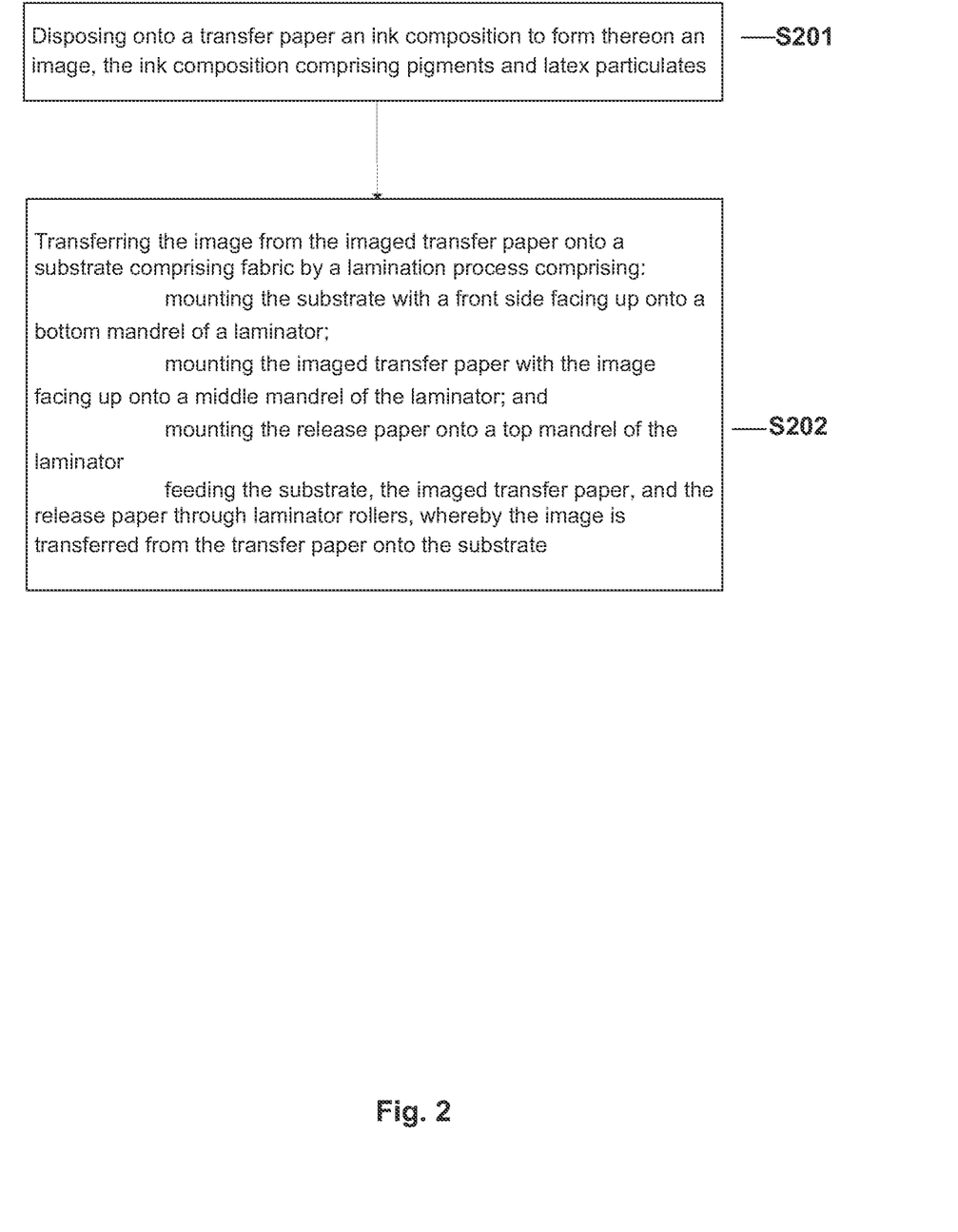
FIG. 2 is a flowchart illustrating the processes involved in another example of a method of printing described herein.

FIG. 2 is a flowchart illustrating the processes involved in another example of such a method of printing. As shown in FIG. 2, the method of printing may comprise disposing onto a transfer paper an ink composition to form thereon an image, the ink composition comprising pigments and latex particulates (S201). The method may further comprise transferring the image from the imaged transfer paper onto a substrate comprising fabric by a lamination process (S202). In this example, the lamination process may comprise mounting the substrate with a front side facing up onto a bottom mandrel of a laminator. The lamination process may further comprise mounting the imaged transfer paper with the image facing up onto a middle mandrel of the laminator. The lamination process may further comprise mounting the release paper onto a top mandrel of the laminator feeding the substrate, the imaged transfer paper, and the release paper through laminator rollers. As a result, the image is transferred from the transfer paper onto the substrate.

The ink composition may be any of those described herein. The transfer paper may be any paper that may facilitate transfer of image from one medium to another. In example, the transfer paper is a heat transfer paper ("HTP"). The transfer paper may be an extruded inkjet heat transfer paper. The HTP may comprise an extruded media film using commercial polymers. The polymer may comprise soft polyvinyl alcohol ("PVOH"), which is extrudable and commercially known as G-polymers. These polymers may be formulated (compounded) to add the imaging desired properties. These extruded polymer films may be printed with dye, pigment, and/or latex inks. In one example, the polymer is a uniquely substituted polyvinyl alcohol known as G-polymer from Soarus LLC, USA. In one example, EVOH is used—SoamoL™ is ethylene-vinyl alcohol copolymer (EVOH), developed by Nippon Gohsei. SoamoL™ is a polyvinyl alcohol (PVOH) with the water resistance, extrudability, and other properties of ethylene components.

Examples of commercially available transfer paper include those available from Neenah Paper, Inc., including 3G JET OPAQUE®, JET PRO® SS HTP, JET OPAQUE® II, Laser transfer paper EZP, Laser-one-Opaque® #9753PO, and Laser-one-Opaque® #9753PO. In one example, Neenah transfer paper is made of multi-layer coating and extruded coating up to 6 layers. It has no support liner. The whole composite adheres to the fabric. It is designed to transfer in the normal, right way and not the reverse ("mirrored") image way—image is printed on top side of JET OPAQUE®. The bottom side is layered down onto the fabric.

The release paper may be any suitable release paper for thermal release in an inkjet printing process. The release paper may be, for example, silicone parchment paper, Kraft parchment paper, etc. In one example, silicone paper is a regular raw paper coated with binders that contains the silicate, SiO2 or copolymers of. In one example, the silicone paper has a low surface energy, around 20 dyne/cm, and has minimal tendency to adhere to other material, similar to Teflon. In one example, a silicone paper is layered on top of the print side onto the printed inks. Heat press may be applied directly to the silicone paper for short time. Once done the silicone paper may be removed and the print/image appears on fabric with some penetration into the fabric to get the proper adhesion. In one example, 3G JET OPAQUE®, transfer paper is suitable or the latex-containing ink compositions.

In the printing method described herein, the image disposed over the transfer paper and the image transferred onto the substrate may have the same orientation. In other words, in contrast to the pre-existing technique of fabric printing, which involves printing an image in reverse and then transfer (with heat) the reversed ("mirrored") image onto a fabric, the printing methods described herein do not need to such a reversion. In addition, it is possible as an option to use the HTP for reverse printing where the latex-containing ink compositions are in direct contact with fabric and when an extruded polymer (e.g., G-polymer) faces up. In some applications this may be advantageous to the end user. One advantage is the choice of the substrate hand feel after the ink is transferred.

The lamination process herein may be carried out at a temperature that is lower than that used in the pre-existing fabric printing based on dye sublimation. For example, the lamination process temperature may be lower than about 400° F.—e.g., less than or equal to about 350° F., about 300° F., about 250° F., about 200° F., or lower.

The lamination process may comprise additional processes. For example, the lamination as shown in FIG. 1 may further comprise mounting the substrate with a front side facing up onto a bottom mandrel of a laminator. The lamination process may further comprise mounting the imaged transfer paper with the image facing up onto a middle mandrel of the laminator. The lamination process may further comprise mounting the release paper onto a top mandrel of the laminator.

Figure 3:
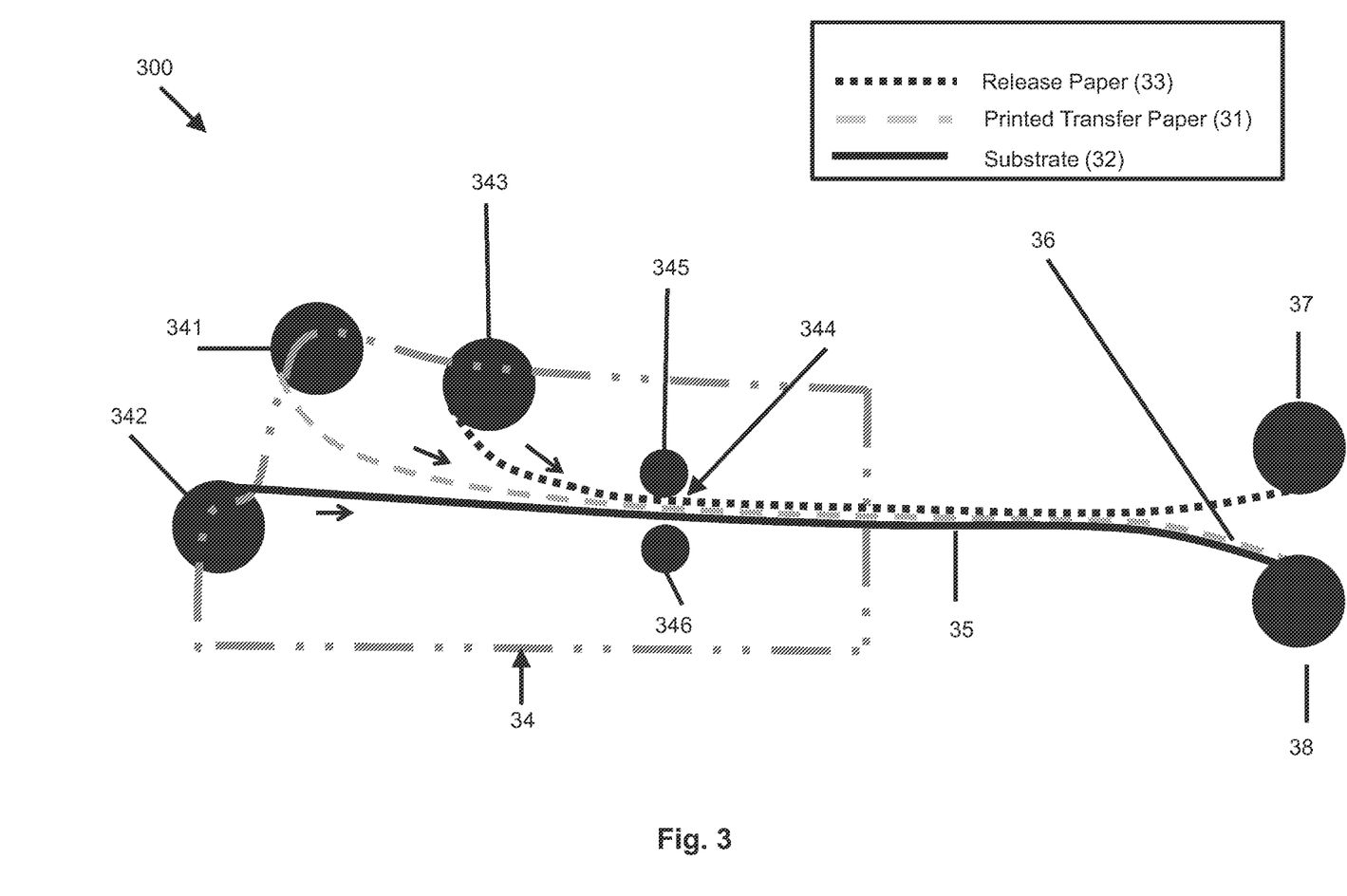
FIG. 3 is a schematic diagram showing a printing/transfer system in one example described herein.

FIG. 3 is a schematic diagram of a printing/transfer system 300 in one example. The system 300 may comprise a printer (not shown) to dispose onto a transfer paper an ink composition to form thereon an image ("printed transfer paper") 31. The ink composition may be any of those described herein, such as one comprising pigments and latex particulates. The system 300 processes the printed transfer paper 31, the substrate comprising fabric 32, and release paper 33. The system may comprise a laminator 34. Either an office type or an industrial type laminator may be used. The process may also be accomplished using calendering machines.

The laminator may comprise a middle mandrel 341, onto which the imaged (or printed) transfer paper 31 is mounted. In this example, the image on the printed transfer paper 31 faces up. The laminator may further comprise a bottom mandrel 342, onto which the substrate 32 is mounted. In this example, the substrate 32 is mounted onto the bottom mandrel 342 with the front side facing up. The laminator may further comprise a top mandrel 343, onto which the release paper 33 is mounted.

In FIG. 3, the printed transfer paper 31, the substrate 32, and the release paper 33 are run through a nip opening 344 of a heated laminator top roller 345 and laminator bottom roller 346. The image is then transferred from the printed transfer paper 31 onto the substrate 31. A three-layered laminate 35 (printed transfer paper 31, substrate 32, and release papers 33 sandwiched together) then leaves the laminator 34. Subsequently, the release paper 33 is removed and wound up onto a roller 37, such as for reuse, while the final two-layer product 36 with the a printed transfer paper 31 (no longer having image thereon) disposed over the substrate 32 (now containing the image). The product 36 is wound onto a separate roller 38 (from the roller 37).

The method of printing described herein may comprise additional processes. For example, in the case where the ink composition comprises an aqueous vehicle, the method further comprises curing the ink composition to evaporate the vehicle before the transferring process. The curing temperature may vary depending on the materials involved. For example, the curing temperature may be between about 40° C. and about 200° C.—e.g., between about 60° C. and about 150° C., between about 80° C. and about 100° C., etc. Other temperatures are also possible.

Due at least in part to the features described above, the printing method described herein, particularly with the ink composition described herein, may exhibit several beneficial properties, especially in comparison to the pre-existing printing techniques.

The following is provided to further illustrate a contrast between the pre-existing heat transfer technique and the ink transfer method described herein. Traditional heat transfer generally involves using a heat press to imprint a design or image onto various substrates (e.g., fabrics, t-shirts, etc.). The process involves using heat and pressure for a specified period of time. The heat press includes an upper and lower platten. The upper platten is heated to the desired temperature. Heat presses use different mechanisms for contact between the upper and lower plattens. These include clampshell or swing mechanisms among others.

In pre-existing printing, the procedure to transfer a print onto a fabric is generally as follows: An image is printed on a transfer paper. In many cases, particularly for white or light fabrics, a mirror (reverse) image is printed. The fabric is placed on the bottom (lower) platten of the heat press. The printed paper is then placed on the fabric. The upper heated platen of the heat press is then brought into contact with the lower platten and locked into place to apply the necessary heat and pressure. After a specified time, generally between 15-30 secs, the printed image is transferred (embeded or imprinted) onto the fabric. The upper platten is then removed after transfer. After cooling down, the release or liner paper is removed, exposing the transferred image. This pre-existing printing process has a low throughput and is time consuming.

By contrast, the printing methods described herein may enable creating images for outdoor signage, on demand textile printing, and clinging on a three-dimensional ("3D") object. As described above, the pre-existing transfer technology is predominated by using sublimation dyes printed on inkjet media (paper) and transferred onto polyester fabric using high heat (400° F.) and pressure. The sublimation process works mostly if not only with polyester fabrics not cotton. In contrast, the printing method described herein provides a printing that is low cost and environmentally friendly—latex ink compositions are environmentally friendly. Also, using latex inks may accelerate the transfer process by reducing both the transfer temperature and the pressure, both normally required to achieve good transfers. The ink compositions described herein also provide good durability and wash fastness in heat transfer of images. In one example, this is achieved by utilizing the digital advantage of design proofing process for a fabric. This helps mass production on demand without keeping inventory of the actual printed fabric. In one example, the printing method described herein provide fabric and design on demand.

The printing method described may have additional advantages. For example, the overall cost of the finished printing product may be significantly reduced from an average of >\$1.0/ft$^2$ (in the case of a pre-existing printing method) to less than \$0.20/ft$^2$. Additionally, with respect to scalability, the printing method described herein may provide a platform that may be easily leveraged to other graphic media application products such as for vehicle wraps, vehicle upholstery, backlit films, etc. Also, in contrast to the pre-existing printing technique, the printing method described herein uses less heat to transfer (e.g., at 260-300° F., in contrast to 400° F.) and saves energy for the end user. The printing method described herein may run at faster speed through the continuous transfer process.

Non-Limiting Working Example

Latex particulates were prepared as follows: Water (169 g) was heated to 77° C. with mechanical agitation. An aqueous emulsion including water (13.7 g), copolymerizable surfactant Hitenol BC-10 (0.70 g)(Dai-lchi Kogyo Seiyaku Co., Ltd), styrene (17.7 g), and butyl acrylate (37.5 g) was prepared. At 77° C., 2 g (3%) of this monomer emulsion was added to the reactor followed by 0.37 g potassium persulfate (dissolved in a minimal amount of water). After 15 minutes, this monomer mixture was added to the reactor over 72 minutes. When the first polymerization was completed, a second emulsion comprised of water (34.9 g), copolymerizable surfactant Hitenol BC-10 (1.6 g), styrene (21.1 g), methyl 10 methacrylate (99.0 g), butyl acrylate (6.1 g) and methacrylic acid (2.6 g) was added over 168 minutes. Residual monomer was reduced by typical methodology—i.e., using ascorbic acid and t-butyl hydroperoxide. After cooling to near ambient temperature, pH was adjusted to ~8 with dilute potassium hydroxide; inkjet suitable aqueous biocides were added. The two monomer compositions' average homopolymer refractive indices were 1.5±0.2. The resulting acrylic latex was 41% solids; particle size 0.23 µm; viscosity <50 cps and had a latex structure including intermingled polymer strands.

The latex particulates were incorporated into an ink composition, of which the composition is shown in Table 1.

TABLE 1

Composition of the latex particulates used in the ink composition

| Compositional Elements (on active basis) | Function | Ink (Wt %) |
|---|---|---|
| 2-Pyrrolidinone(solvent) | Solvent/Humectant | 16 |
| 2-Methyl-1,3-propanediol | Solvent/Humectant | 9 |
| Crodafos N3 Acid | Surfactant | 0.5 |
| Nonionic Surfactant (wetting agent) | Wetting agent | 0.5 |
| Silicone surfactant (wetting agent) | Wetting agent | 1.0 |
| Latex particulates | Latex polymer | 7 |
| Pigment dispersion (black) | Pigment as colorant | 1.5 |
| Michem ® Emulsion 48040M2 | Wax | 1 |
| Water | Vehicle | Balance |

The printing process of transfering printed images onto a fabric (substrate) using a latex-containing ink composition as shown in Table 1 was carried out. The printing process was a continous process involving using a laminator. Note that the printing/transferring process is also captured by FIG. 3. The fabric (polyester) was first mounted onto a texile or fabric supply mandrell. The transfer paper roll, with the image printed without mirroring and facing up, was mounted onto the transfer paper supply mandrell. Additionally, the release paper was mounted onto the release paper supply mandrell. All three of the transfer paper, the fabric, and the release paper were run through the heated top and bottom rollers nip opening. The laminator was set at defined transfer settings (speed, pressure and temperature). These are rollers speed, nip opening (mm) and roller temperatures. Finaly, the transferred image was then wound onto a separate roller. The release paper was wound onto an other roller and may be resued later.

Laminator nip-opening (pressure, mm), roll speed (ft/min), roll temperature (° F.) and release paper type were considered as input variables. The effect of nip-opening (pressure, mm), roll speed (ft/min), roll temperature (° F.), release paper, media exit temperature (° F.), media caliper decrease, applied pressure (PSI), peel adhesion strength (N), and imaged gamut volume was determined. Laminated media exit temperature, media caliper decrease, pressure applied (PSI), peel adhesion strength (N) and imaged gamut volume are output variables.

In the experiment described in this Exmaple, two laminators were used to determine the operating window (of operating parameters): Sircle EM40HC manufactured by Laminator Specialties, Temecula, Calif., USA and Seal 62 Pro manufactured by Neschen Americas, Elkridge, Mass., USA. The EM40HC is a bench top laminator capable of holding laminating films of up to 40" wide width. It has a preset laminating pressure and may be used for materials with up to 4.8 millimeter thickness. It is capable of running at speeds ranging from 0-10 feet per minute (3 m/minute). Its speed dial is set in percent. The laminator has two heat shoes and each heat shoe may be set separatley to the desired temparature. Two digital temperature readouts are provided for each heat shoe. The maximum recommended temperature is 350° F.

The Seal 62Pro Laminator is a wide format laminator. It has a manual nip-adjustment capability and may process substrates up to 1½ inch (38 mm) thickness. It is capable to speeds up to 20 feet/min (6 m/min). It is capable of holding laminating films of up to 61" wide (1550 mm). The speed on the Sircle EM40HC and the Seal 62pro laminators is set using the laminator dials. A traceable-photo contact tachometer (Fisher Scientific, USA) is also used to determine the correlation of the laminator speed dial and the actual speed in ft/min or m/min. This is accomplished by setting the laminator speed to a defined speed and then placing the tachometer wheel on the laminator rolls to determine the speed. In one example, the tachometer speed reading is measured as a parameter to be controlled.

Laminator roll temperature was detemined from the digital readout on the laminators and also by using a Fisher Scientific IR Type K Thermometer (Fisher Scientific, USA). The IR unit is also used to measure the exit temperature of the transferred media sandwich (release paper-image paper and fabric) as it exits the laminator. This is accomplished by aiming the IR gun onto the top surface of the sandwich. Caliper was measured by using a Starrett micromemeter. Initially, the thickness of the fabric and the transfer paper are determined separately. The thicknesses are then added together. This is the initial thickness. After lamination, the release (silicone or Kraft) paper was removed. The thickness of the imaged area and the fabric were then measured again. This provided the final thickness.

The percent decrease was determined by:

$$((\text{final thickness}-\text{Initial thickness})*100)/(\text{initial thickness}) \qquad (1).$$

The laminator pressure was determined using Sensor Product Prescale Pressure indicating films by Sensor Products, Madison, N.J., USA. These films are available for different pressure ranges. Prior to starting the experiment, appropriate film types with the right pressure range were chosen. The chosen films were Ultra low (28-85 psi) and Extreme low film (7.2-28 psi). (Detailed procedures on using these films is available on the Color Correlation Manual For Pressure Interpretation by Sensor Products Inc.).

After identifying the right film type and pressure range, small pieces of both the color forming piece and donor sheet were cut and these two pieces were placed together. They were then attached on the top side of the release paper before lamination. After application of pressure onto the films through the lamination process, the films formed a magenta color. The magenta color intensity was proportional to the amount of pressure applied.

To determine the pressure, parameters such as exposure time, room temperature and humidity were recorded. The magenta color was matched to the color on the correlation chart. The Pressure in PSI was finally determined using the Density/PSI chart. Gamut volume was determined from a diagnostic plot containing blocks printed with Red, Green, Blue, Black, Cyan, Magenta, Yellow inks. The diagnostic plot was printed on 3G Opaque transfer media. An X-Rite 939 SpectroDensitometer (Grand Rapids, Mich., USA) with a D65 illuminant and a viewing angle of 2° was used to measure L*, a* and b*. CIE L*a*b* and estimated Munsell color gamut volumes are calculated and reported. To determine the Peel adhesion strength (PAS) of the image layer onto the fabric, lamination peel strength test using an Instron Model 5542 controlled by Instron Bluehill2 software was used. ASTM D3330/D3330M Method D standard was followed. A crosshead speed of 300 mm per minute and a maximum travel distance of 150 mm were used. A 1±0 inch wide and 7±1 inch length of image embedded area of the fabric was cut. The sample was separated at one end. It was loaded onto the Instron with the image layer on the upper grips of the Instron and the fabric on the lower grip in a T-peel configuration. The test was conducted and the output was recorded in average force (N).

The test was performed as follows. For each individual point, the laminator was set to the desired set points. A roll of 3G Opaque transfer media was printed with many diagnostics plots using HP L26500 latex printer. 8.5"×11" sheets containing the diagnostics plots were cut out. 8.5"×11" sheets of polyester fabric were also cut out from a polyester roll. The backing from the printed sheets was removed. Caliper measurements of the printed sheet and the polyester were taken. A single sheet of the printed media was placed on top of the polyester sheet. A 8.5"×11" silicone (or Kraft) paper sheet was then placed on top of the imaged sheet. 1"×1" cut pieces of the Sensor prod illuminating film, including the donor and forming pieces attached to each other, were attached on top of silicone (or Kraft) paper.

This sandwich was then fed into the laminator in the machine direction (MD) orientation. While the sandwich was moving though the laminator, the exit temperature was measured with an IR gun. After the sandwich had exited the laminator, the illuminating film color was correlated and the room temperature and humidity were recorded. Laminator roll pressure was then determined using the Density/PSI chart. The silicone (or Kraft) paper was then removed. The caliper of the imaged layer and fabric was taken. Each of these steps were repeated for all other points in this experiment. Image gamut volume of the transferred material was measured. Finally, the peel adhesion strength was measured using an Instron instrument.

Results

Several commercially available heat transfer papers ("HTP") were tested to determine the feasibility of using them in this Example. The papers tested were: HP® Iron-on Transfer paper (available from Hewlett-Packard Company), and 3G Jet-Opaque® II, Jet Pro-SS®, Jet Opaque II, Laser transfer paper EZP, Laser-one-Opaque® #9753PO, Laser-one-Opaque® #9753PO (available from Neenah Paper, Inc.). The 3G Jet-Opaque® II HTP was found to have the best performance, and Jet Opaque II HTP was found to have good performance. Jet Pro-SS® HTP was found to have poor performance, and HP® Iron-on HTP was found incompatible with the latex-containing ink compositions in this Example and exhibiting sever cracking.

The following operating parameters were determined: The suitable nip opening (of a laminator or two rollers setting or calendar machine) applied was determined to be 0-2 mm. The suitable speed applied was determined to be 2-12.5 F/min. The suitable roller temperature applied was determined to be 250-350° F. The suitable roller pressure applied was determined to be 15-100 PSI. Also, a 0-20% caliper decrease of fabric and transfer material after lamination was observed—a caliper decrease beyond 20% would have an adverse effect on color gamut, increase the see through and aesthetically would be noticeable. Finally, the peel adhesion strength should be high such that no image delamination occurs.

The following operating parameters were also determined:

1: A laminator (or two rollers setting or calendar machine) nip opening of 0.5 mm.

2: A laminator (or two rollers setting or calendar machine) speed of 5.3 F/min.

3: A laminator (or two rollers setting or calendar machine) roller temperature of 265-300° F.

4: A 10% caliper decrease of fabric and transfer material after lamination was observed.

5: A higher than 85 PSI laminator roller pressure.

6: The peel adhesion strength should be high such that no image delamination occurs.

7: No loss in gamut volume after transfer of image.

The performance of using different papers and operating conditions using the two laminators tested were shown in Table 2 and 3, respectively. All of the samples shown in Tables 2 and 3 had the 3G Opaque paper as the media, HP L26500 as the printer, polyester as the fabric, and the sheet orientation being the machine direction. Table 2 shows that silicone parchment paper performed much better than Kraft paper in the laminator Sircle EM40HC. Table 3 shows that of the samples with silicone papers, samples 3 and 5 performed better than the others in the laminator Seal 62Pro.

TABLE 2

Laminator: Sircle EM40HC (manufactured by Laminator Specialties)

| | Input Variable | | | | Output Variable | | | | |
| --- | --- | --- | --- | --- | --- | --- | --- | --- | --- |
| Sheet # | Nip opening (Pressure, mm) | Speed (FT/min) | Setup Laminator Temp (F.) | Release Paper | Exit Temp (° F.) | Caliper % Decrease | Pressure (PSI) from Film | Peel Strength (Ave Force, N) | Gamut Volume CIE LAB (×1000) | Comments |
| 1 | <1 | 2.8 | 200 | Kraft | 145 | 2 | 67.5 | NA | 189 | Kraft paper stuck on image |
| 2 | <1 | 2.8 | 250 | Kraft | 168 | 2 | 78 | NA | 188 | Kraft paper stuck on image |
| 3 | <1 | 2.8 | 300 | Kraft | 200 | 6 | 72.4 | NA | 196 | Kraft paper stuck on image |
| 4 | <1 | 2.1 | 300 | Silicone Parchment | 219 | 13 | 67.5 | 6.05 | 218 | Good adhesion and color gamut |

TABLE 3

Laminator: Seal 62Pro

| Sheet # | Nip opening (Pressure, mm) | Speed (FT/min) | Setup Laminator Temp (F.) | Release Paper | Exit Temp (° F.) | Caliper % Decrease | Pressure (PSI) from Film | Peel Strength (Ave Force, N) | CIE LAB (×1000) | Comments |
| --- | --- | --- | --- | --- | --- | --- | --- | --- | --- | --- |
| 1 | 0.5 | 5.3 | 200 | Silicone Parchment | 179 | 12 | 76.6 | 0.84 | 170 | Poor adhesion |
| 2 | 0.5 | 5.3 | 225 | Silicone Parchment | 170 | 10 | >85 | 4.35 | 166 | Poor adhesion |
| 3 | 0.5 | 5.3 | 250 | Silicone Parchment | 188 | 10 | >85 | Permanent bonding | 175 | Excellent adhesion |
| 4 | 0.5 | 12.4 | 250 | Silicone Parchment | | 6 | >85 | 3.87 | 202 | Poor adhesion |
| 5 | 0.5 | 5.3 | 265 | Silicone Parchment | 175 | 8 | >85 | Permanent bonding | 220 | Excellent adhesion and color gamut |
| 6 | 0.5 | 12.4 | 265 | Silicone Parchment | 230 | 8 | >85 | 3.53 | 204 | Poor adhesion |

The overall performance is evaluated for both the fluidic coating and the extruded coating. The fluid coating contained acrylate and polyurethane dispersion mix with cross linker and silica pigments. This was compared to the current commercial HP transfer paper used with aqueous inks. All of the fabric compared are 100% cotton, the transfer time was 30 seconds, and the transfer pressure was at the setting "medium," as preset by the machine. The improvements for using latex inks over the current HP transfer product are summarized in Table 4.

TABLE 4

Selecting Best Candidate and Best Transfer Conditions

| Transfer media/Paper | Printer | Inks | Transfer Temp (° F.) | Transferred Image Color Quality | Transferred Image Adhesion to Fabric | Ink Cracking |
|---|---|---|---|---|---|---|
| Control HP Commercial Sample (aqueous Inks) | Z6100 | Aqueous | 375 | 4 | 5 | 5 |
| Fluidic Coating (Latex-containing Inks) | L26500 | Latex | 300 | 3 | 1 | 1 |
| Extruded Coating | L26500 | Latex | 300 | 5 | 5 | 5 |

Rating 1 = worst; 5 = best

Additional Notes

It should be appreciated that all combinations of the foregoing concepts (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

The indefinite articles "a" and "an," as used herein in this disclosure, including the claims, unless clearly indicated to the contrary, should be understood to mean "at least one." Any ranges cited herein are inclusive.

The terms "substantially" and "about" used throughout this disclosure are used to describe and account for small fluctuations. For example, they may refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%.

Concentrations, amounts, and other numerical data may be expressed or presented herein in a range format. Such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "1 weight % (wt %) to 5 wt %" should be interpreted to include not only the explicitly recited values of 1 wt % to 5 wt %, but also include individual values and sub-ranges within the indicated range. Thus, included in this numerical range are individual values, such as 2, 3.5, and 4, and sub-ranges, such as from 1-3, from 2-4, and from 3-5, etc. This same principle applies to ranges reciting only one numerical value. Furthermore, such an interpretation should apply regardless of the breadth of the range or the characteristics being described.

In this disclosure, including the claims, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, § 2111.03.

What is claimed:

1. A method of printing, the method comprising:
   disposing onto a transfer paper an ink composition to form thereon an image, the ink composition comprising pigments and latex particulates; and
   transferring the image onto a substrate comprising fabric by a lamination process comprising:
      laminating together the substrate, the imaged transfer paper, and a release paper which is separate from the imaged transfer paper, by feeding the substrate, the imaged transfer paper, and the release paper through laminator rollers and then removing the release paper, whereby the imaged transfer paper adheres to the substrate such that the image has the same orientation as when the image was formed on the transfer paper.

2. The method of claim 1, wherein the ink composition further comprises:
   an aqueous ink vehicle; and
   a wax emulsion having a melting point of between 60° C. and 110° C.

3. The method of claim 1, wherein
   the ink composition further comprises an ink vehicle, which comprises water and a co-solvent having a boiling point of between 160° C. and 250° C., the co-solvent present in an amount of between 1 wt % and 40 wt %; and
   the ink vehicle comprises no more than 3 wt % of non-volatile co-solvent and no more than 5 wt % of volatile co-solvent.

4. The method of claim 1, wherein the latex particulates comprise multiple intermingled discrete polymer strands, including:
   a low Tg polymer strand having a Tg below 50° C., and
   a high Tg polymer strand having a Tg at 50° C. or above;
   wherein the Tg of the high Tg polymer strand is at least 50° C. higher than the Tg of the low Tg polymer strand.

5. The method of claim 1, wherein the latex particulates comprise polymers having monomers selected from at least one of acrylates, methacrylates, vinyls, styrenes, ethylenes, vinyl chlorides, vinylidene chlorides, maleate esters, fumarate esters, itaconate esters, combinations thereof, and mixtures thereof.

6. The method of claim 1, wherein the lamination further comprises:
    mounting the substrate with a front side facing up onto a bottom mandrel of a laminator;
    mounting the imaged transfer paper with the image facing up onto a middle mandrel of the laminator; and
    mounting the release paper onto a top mandrel of the laminator.

7. The method of claim 1, wherein the lamination process is carried out at a temperature of lower than 400° F.

8. The method of claim 1, wherein the ink composition comprises an aqueous vehicle, and the method further comprises curing the ink composition at a temperature of between 80° C. and 100° C. to evaporate the vehicle before the transferring.

9. The method of claim 1, wherein the lamination has at least one of the following:
    the release paper comprises silicone;
    the transfer paper comprises an extruded inkjet heat transfer paper, and
    the fabric comprises at least one of cotton and polyester.

10. The method of claim 1, wherein the lamination process is carried out at a temperature of lower than 300° F.

11. The method of claim 1, wherein the ink composition is devoid of water-soluble dyes.

12. The method of claim 1, further comprising reusing the release paper for a subsequent lamination process.

13. The method of claim 1, wherein the release paper comprises silicone.

14. A method of printing, the method comprising:
    disposing onto a transfer paper an ink composition to form thereon an image, the ink composition comprising pigments and latex particulates; and
    transferring the image from the imaged transfer paper onto a substrate comprising fabric by a lamination process comprising:
        mounting the substrate with a front side facing up onto a bottom mandrel of a laminator;
        mounting the imaged transfer paper with the image facing up onto a middle mandrel of the laminator;
        mounting a release paper onto a top mandrel of the laminator; and
        feeding the substrate, the imaged transfer paper, and the release paper through laminator rollers, whereby the imaged transfer paper adheres to the substrate.

15. The method of claim 14, wherein the latex particulates comprise polymers having monomers selected from at least one of acrylates, methacrylates, vinyls, styrenes, ethylenes, vinyl chlorides, vinylidene chlorides, maleate esters, fumarate esters, itaconate esters, combinations thereof, and mixtures thereof.

16. The method of claim 14, wherein the lamination process is carried out at a temperature less than 400° F.

17. A system, comprising:
    a printer to dispose onto a transfer paper an ink composition to form thereon an image, the ink composition comprising pigments and latex particulates; and
    a laminator to:
        mount a substrate comprising a fabric with a front side facing up onto a bottom mandrel of the laminator;
        mount the imaged transfer paper with the image facing up onto a middle mandrel of the laminator;
        mount a release paper onto a top mandrel of the laminator; and
        feed the substrate, the imaged transfer paper, and the release paper through laminator rollers, whereby the imaged transfer paper adheres to the substrate.

18. The system of claim 17, wherein the latex particulates comprise polymers having monomers selected from at least one of acrylates, methacrylates, vinyls, styrenes, ethylenes, vinyl chlorides, vinylidene chlorides, maleate esters, fumarate esters, itaconate esters, combinations thereof, and mixtures thereof.

* * * * *